United States Patent
Choi et al.

(10) Patent No.: US 8,823,646 B2
(45) Date of Patent: Sep. 2, 2014

(54) METHOD AND DISPLAY APPARATUS FOR CALCULATING COORDINATES OF A LIGHT BEAM

(75) Inventors: Chan-hee Choi, Seoul (KR); Jong-hyuk Jang, Gunpo-si (KR); Seung-kwon Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 252 days.

(21) Appl. No.: 13/369,789

(22) Filed: Feb. 9, 2012

(65) Prior Publication Data

US 2012/0262373 A1 Oct. 18, 2012

(30) Foreign Application Priority Data

Apr. 12, 2011 (KR) .................. 10-2011-0033604

(51) Int. Cl.
*G06F 3/033* (2013.01)
(52) U.S. Cl.
USPC ........................................... 345/158
(58) Field of Classification Search
USPC .............. 345/156–184; 348/135–141; 353/42
See application file for complete search history.

(56) References Cited

U.S. PATENT DOCUMENTS

| | | | | |
|---|---|---|---|---|
| 6,618,076 | B1* | 9/2003 | Sukthankar et al. | 348/180 |
| 7,683,881 | B2* | 3/2010 | Sun et al. | 345/156 |
| 2001/0010514 | A1* | 8/2001 | Ishino | 345/158 |
| 2003/0052859 | A1* | 3/2003 | Finley | 345/156 |
| 2008/0205701 | A1* | 8/2008 | Shamaie et al. | 382/103 |
| 2011/0248913 | A1* | 10/2011 | Willis et al. | 345/156 |

* cited by examiner

*Primary Examiner* — Seokyun Moon
*Assistant Examiner* — Peijie Shen
(74) *Attorney, Agent, or Firm* — Sughrue Mion, PLLC (57) ABSTRACT

A display apparatus is disclosed which includes: a camera which senses a light beam focused on a screen; a video processor which processes at least one of a first image including a reference position for calculating coordinates of the light beam and a second image corresponding to the coordinates of the light beam to be displayed on the screen; and a controller which calculates the coordinates of the light beam on the basis of the reference position changed in accordance with change in a display characteristic of the first image, and transmits the calculated coordinates to the video processor so that the second image corresponding to the calculated coordinates can be displayed on the screen.

17 Claims, 5 Drawing Sheets

METHOD AND DISPLAY APPARATUS FOR CALCULATING COORDINATES OF A LIGHT BEAM

CROSS-REFERENCE TO RELATED APPLICATION

This application claims priority from Korean Patent Application No. 10-2011-0033604, filed on Apr. 12, 2011 in the Korean Intellectual Property Office, the disclosure of which is incorporated herein by reference.

BACKGROUND

1. Field

Methods and apparatuses consistent with the exemplary embodiments relate to a display apparatus having a pointing device for projecting a light beam on a screen and a control method thereof. More particularly, the exemplary embodiments relate to a display apparatus having an improved structure for calculating coordinates of a light beam focused on a screen by a pointing device and a control method thereof.

2. Description of the Related Art

A display apparatus is an apparatus which processes a video signal or video data received from an exterior source or stored in an interior through various processes, and displays the video signal or video data on a panel or screen. The display apparatus may be achieved in various forms such as a TV, a monitor, a portable multimedia player (PMP), etc. For example, such a display apparatus may be achieved by an electronic copy board that senses a predetermined trace formed on a screen and displays an image based on the sensed trace on the screen.

The display apparatus of the electronic copy board senses pressure on a pressure sensitive touch screen, a type of sensing a trace of a light beam projected from a pointing device and focused on a screen with a camera, etc.

In the situation of the display apparatus, there is a need of calculating coordinates of the trace sensed by the camera with respect to a preset reference position, in order to display an image based on the trace of the light beam. Such a reference position is determined by a predetermined image formed on the screen by the display apparatus. However, a display characteristic of an image displayed on the screen may be varied depending on change in installation environments of the display apparatus, and thus the reference position may also be varied. In this situation, it is difficult to calculate the trace coordinates of the light beam, and if the trace coordinates of the light beam are not properly calculated, it is also difficult to properly display an image corresponding to the relevant trace.

SUMMARY

The foregoing and/or other aspects may be achieved by providing a display apparatus including: a camera which senses a light beam focused on a screen; a video processor which processes at least one of a first image including a reference position for calculating coordinates of the light beam and a second image corresponding to the coordinates of the light beam to be displayed on the screen; and a controller which calculates the coordinates of the light beam on the basis of the reference position changed in accordance with a change in a display characteristic of the first image, and transmits the calculated coordinates to the video processor so that the second image corresponding to the calculated coordinates can be displayed on the screen.

The controller may control the video processor to make a preset partial region of the first image flicker in accordance with change in the reference position, determine the flickering partial region in the first image sensed by the camera, and reset the reference position on the basis of coordinates of the determined partial region.

The controller may set up the reference position corresponding to the coordinates of the preset partial region of the first image sensed by the camera.

The partial region of the first image to be set as the reference position may include at least one of four corners of the first image.

The display apparatus may further include a sensor which senses change in a position of the display apparatus, wherein the controller determines that the display characteristic of the first image is changed in response to a variation in the position of the display apparatus sensed by the sensor being equal to or higher than a preset value.

The display apparatus may further include a sensor which senses change in a position of the display apparatus, wherein, upon sensing a change in position of the display apparatus, the controller calculates coordinates of the reference position changed in accordance with change in a position of the display apparatus. This is on the basis of a performed variation in a position vector of the display apparatus sensed by the sensor, and resets the reference position in accordance with the calculated coordinates.

The sensor may include at least one of a gyroscope sensor, an acceleration sensor and a geomagnetic sensor.

The controller may determine that a display characteristic of the first image is changed in response to a previously stored setting value about a display characteristic of the first image being changed.

The display characteristic of the first image may include at least one setting value from among a relative position of the first image on the screen, and a display size, an aspect ratio, resolution, brightness, color, contrast, etc. of the first image.

The video processor may be of a projection type.

Another aspect may be achieved by providing a control method of a display apparatus, the method including: sensing a light beam focused on a screen; sensing change in a display characteristic of a first image including a reference position for calculating coordinates of the light beam; calculating the coordinates of the light beam on the basis of the reference position changed in accordance with the change in the display characteristic of the first image, and displaying a second image corresponding to the calculated coordinates on the screen.

The calculating of the coordinates of the light beam on the basis of the reference position changed in accordance with the change in the display characteristic of the first image may include: making a preset partial region of the first image flicker; and determining the flickering partial region in the first image, and resetting the reference position on the basis of coordinates of the determined partial region.

The reference position may be set up to correspond to the coordinates of the preset partial region of the first image.

The partial region of the first image to be set as the reference position may include at least one of four corners of the first image.

The sensing of the change in the display characteristic of the first image may include: sensing change in a position of the display apparatus; and determining that the display characteristic of the first image is changed in response to a variation in the position of the display apparatus sensed by the sensor being equal to or higher than a preset value.

The sensing of the change in the display characteristic of the first image may include: sensing a variation in a position vector of the display apparatus; and calculating coordinates of the changed reference position on the basis of the sensed variation in the position vector, and resetting the reference position in accordance with the calculated coordinates.

The sensing of the variation in the position vector of the display apparatus may include sensing the variation in the position vector of the display apparatus through at least one of a gyroscope sensor, an acceleration sensor and a geomagnetic sensor.

The sensing of the change in the display characteristic of the first image may include: determining that a display characteristic of the first image is changed in response to a previously stored setting value about a display characteristic of the first image being changed.

The display characteristic of the first image may include at least one setting value from among a relative position of the first image on the screen, and a display size, an aspect ratio, resolution, brightness, color, contrast, etc. of the first image.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings. Exemplary embodiments will be described regarding elements that directly relate to the spirit of the present inventive concept, and descriptions of other elements will be omitted. However, it does not mean that the elements whose descriptions are omitted are unnecessary for embodying an apparatus or a system according to the inventive concept.

Figure 1:
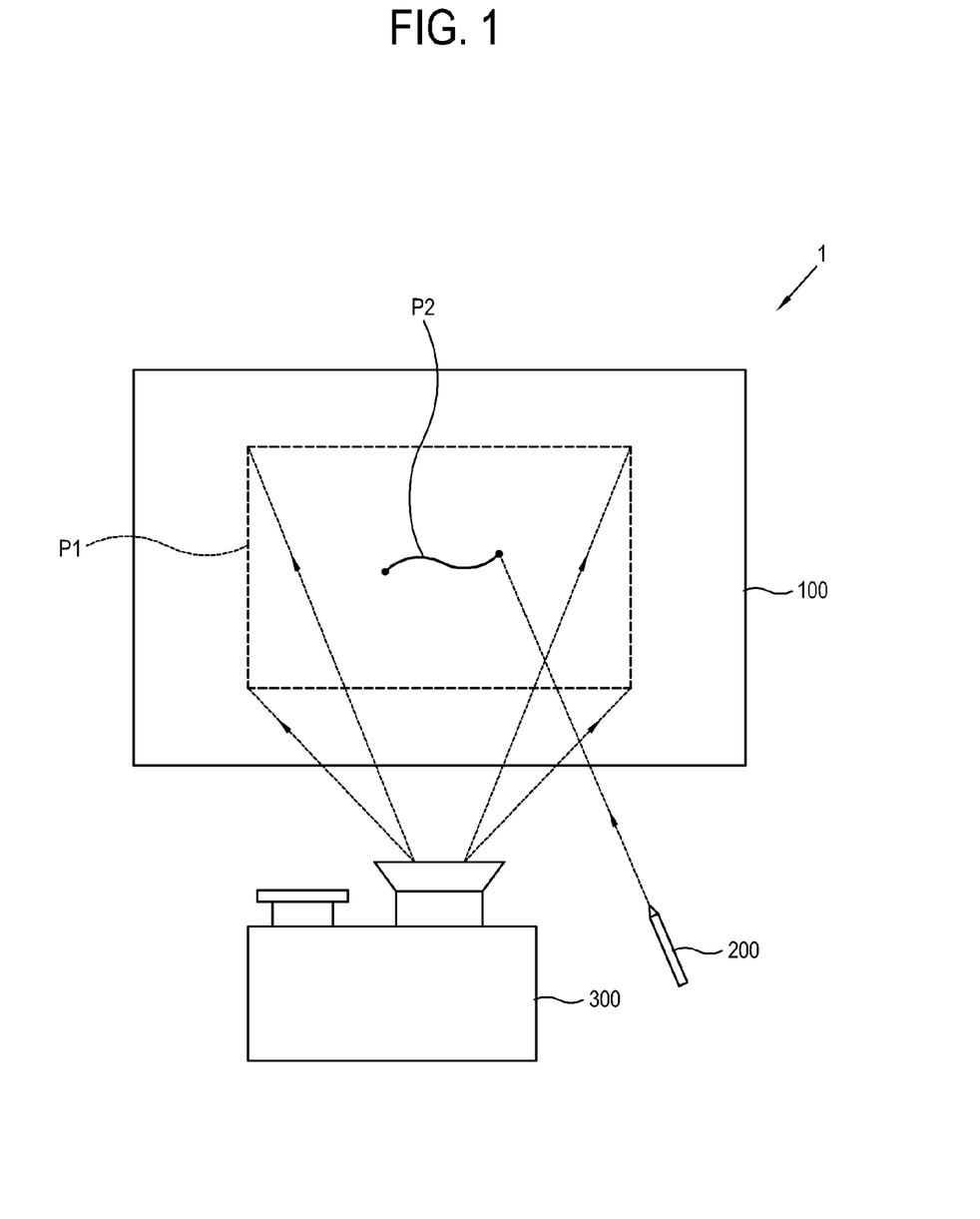
FIG. 1 shows an example of a display system according to an exemplary embodiment.

FIG. 1 shows an example of a display system 1 according to an exemplary embodiment.

As shown in FIG. 1, a display system 1 according to this exemplary embodiment includes a screen 100, a pointing device 200 projecting a light beam and focusing a trace of the light beam on the screen 100, and a display apparatus 300 processing an image P2 corresponding to coordinates of the light beam focused on the screen 100. Particularly, according to this exemplary embodiment, the display apparatus 300 is achieved by a projector which projects an image P1 on to screen 100, thereby displaying the large-sized image P1.

Screen 100 is arranged in the form of being mounted to, etc., on a substantially straightly standing surface such as a wall surface, and an image P1 projected from the display apparatus 300 is displayed on the surface. Screen 100 may have various sizes, colors, etc. as long as images P1 and P2 are displayed. For example, screen 100 may be white so that the image P1 can be more clearly displayed and the trace P2 of the light beam can be easily sensed.

Screen 100 may include a flexible material so as to be easily arranged in and removed from the arrangement surface, or a solid material to be firmly arranged on the arrangement surface. However, such a material does not limit the present inventive concept.

Pointing device 200 generates a light beam, and projects the generated light beam on to screen 100 in a predetermined direction. Pointing device 200 is shaped like a bar to be gripped by a user, of which generation of the light beam and a projecting direction, etc. are controlled by a user. Pointing device 200 generates the light beam having a wavelength range of an infrared or visible ray in accordance with its realization.

Display apparatus 300 senses the light beam focused on screen 100, and projects the image P2 which corresponds to the coordinates of the sensed light beam on to screen 100. Specifically, in response to a user causing pointing device 200 to project the light beam on to screen 100, display apparatus 300 calculates the coordinates of the trace of the light beam on the basis of a preset image P1. Further, display apparatus 300 projects the image P2, which contains a line trace drawn along the calculated coordinates, on to screen 100. Thus, the trace of the light beam drawn by a user using pointing device 200 is displayed as image P2 on screen 100.

Figure 2:
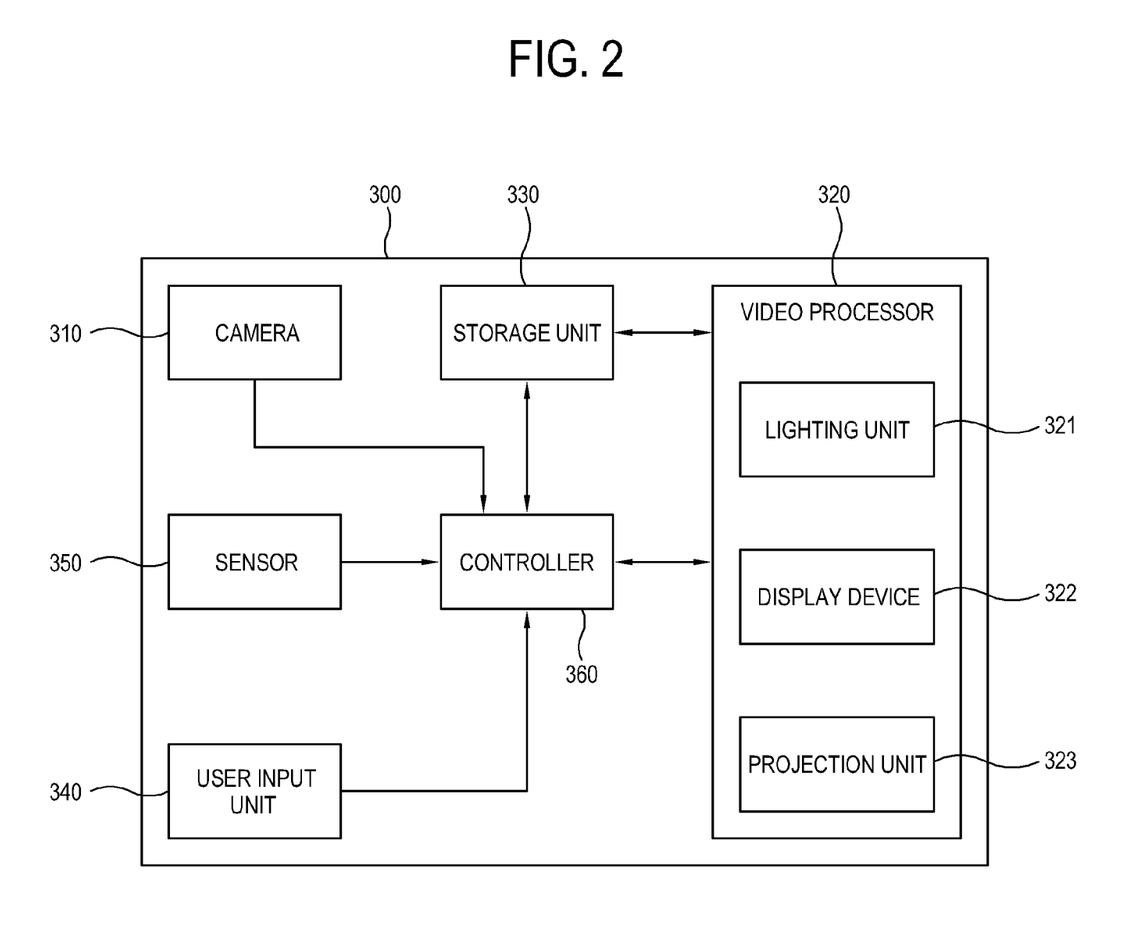
FIG. 2 is a block diagram of a display apparatus of FIG. 1.

Below, a detailed configuration of display apparatus 300 will be described with reference to FIG. 2. FIG. 2 is a block diagram of display apparatus 300.

As shown in FIG. 2, display apparatus 300 in this exemplary embodiment includes a camera 310 for sensing a light beam projected from pointing device 200 and focused on screen 100, a video processor 320 for processing the preset first image P1 and the second image P2 corresponding to the coordinates of the light beam sensed by camera 310 to be displayed on screen 100, a storage unit 330 for storing various setting information, which video processor 320 will refer to for displaying images P1 and P2, a user input unit 340 controlled by a user and outputting various preset control commands, a sensor 350 sensing a position change of display apparatus 300, and a controller 360 controlling a generic configuration of the display apparatus in accordance with preset events generated by user input unit 340 or sensor 350.

Here, the terms the first image P1 and the second image P2 are used just for convenience in distinguishing between them, and such a term does not limit the present inventive concept.

Camera 310 receives and senses light reflected from screen 100 when the light beam projected from pointing device 200 is focused on screen 100, and transmits sensing results to controller 360 so that controller 360 can calculate the coordinates of the trace of the light beam on screen 100. To this end, camera 310 includes a lens configuration (not shown) to receive light, and a complementary metal oxide semiconductor (CMOS) or charge-coupled device (CCD) image sensor (not shown) to sense light received through the lens configuration.

In this exemplary embodiment, camera 310 belongs to display apparatus 300, but not limited thereto. Alternatively, the camera may be separately provided in and capable of communicating with display apparatus 300.

Video processor 320 processes a video signal or video data received from an exterior source through various processes and displays the received video signal or video data as the first image P1 on screen 100. Also, video processor 320 processes second image P2 which corresponds to the coordinates of the light sensed by camera 310 to be displayed on screen 100.

In this exemplary embodiment, video processor 320 may be achieved by a projector, but is not limited thereto. Video processor 320 includes a lighting unit 321 generating and emitting light, a display device 322 displaying an image on a plane on the basis of the light emitted from the lighting unit 321, and a projection unit 323 magnifying and projecting an image displayed by display device 322 on to screen 100.

Lighting unit 321 includes a light source (not shown) for generating light, and an optical lens (not shown) for variously controlling optical properties such as parallelization, uniformization, polarization, condensation, etc. of the light generated from the light source (not shown) and emitting it to display device 322. Further, a plurality of optical lenses (not shown) is arranged along an optical path to correct aberration.

Display device 322 selectively transmits or reflects the light emitted from lighting unit 321 and forms an image. Display device 322 may be achieved by a reflective display device that reflects incident light selectively with regard to each pixel so as to form an image, or a transmissive display device that transmits incident light selectively with regard to each pixel so as to form an image. The reflective display device includes a digital micro-mirror device (DMD), a reflective liquid crystal on silicon (LCOS), etc.

Projection unit 323 magnifies an image formed on display device 322 by various lens configurations (not shown) arranged along the optical path and projects the magnified image on to screen 100, so that an image formed on display device 322 can be magnified and displayed on screen 100.

Storage unit 330 may be achieved by a non-volatile memory such as a flash memory or a hard disk drive. Storage unit 330 stores various setting information about display characteristics of the images P1 and P2 displayed by video processor 320. Such setting information may be variously designated, and for example may contain a relative position of first image P1 on screen 100, and a display size, an aspect ratio, resolution, brightness, color, contrast, etc. of first image P1. Storage unit 330 is provided so that video processor 320 can have access thereto and process images P1 and P2 to be displayed based on the setting information of storage unit 330.

User input unit 340 may be achieved by an input panel arranged outside display apparatus 300, or by a remote controller separated and distant from display apparatus 300. User input unit 340 outputs a command for controlling operation of display apparatus 300 in accordance with control by a user. For example, user input unit 340 may update the setting information in storage unit 330, and may adjust the display characteristics of images P1 and P2 on the basis of the updated setting information.

Sensor 350 senses whether display apparatus 300 is changed in a position and senses position variation, thereby transmitting sensing results to controller 360. To this end, sensor 350 may be achieved by a gyroscope sensor, an acceleration sensor, a geomagnetic sensor, etc.

Controller 360 calculates trace coordinates of a light beam transmitted from camera 310 in order to display second image P2. Since a reference point for reference of coordinates is needed to calculate the coordinates, controller 360 sets up a preset position in first image P1 displayed by video processor 320 as a reference position. Such a reference position may be designated with various positions or a region within first image P1. For example, as shown in FIG. 3, four corners R0, R1, R2 and R3 of first image P1 or at least one of corners R0, R1, R2 and R3 may be designated as the reference position.

Figure 3:
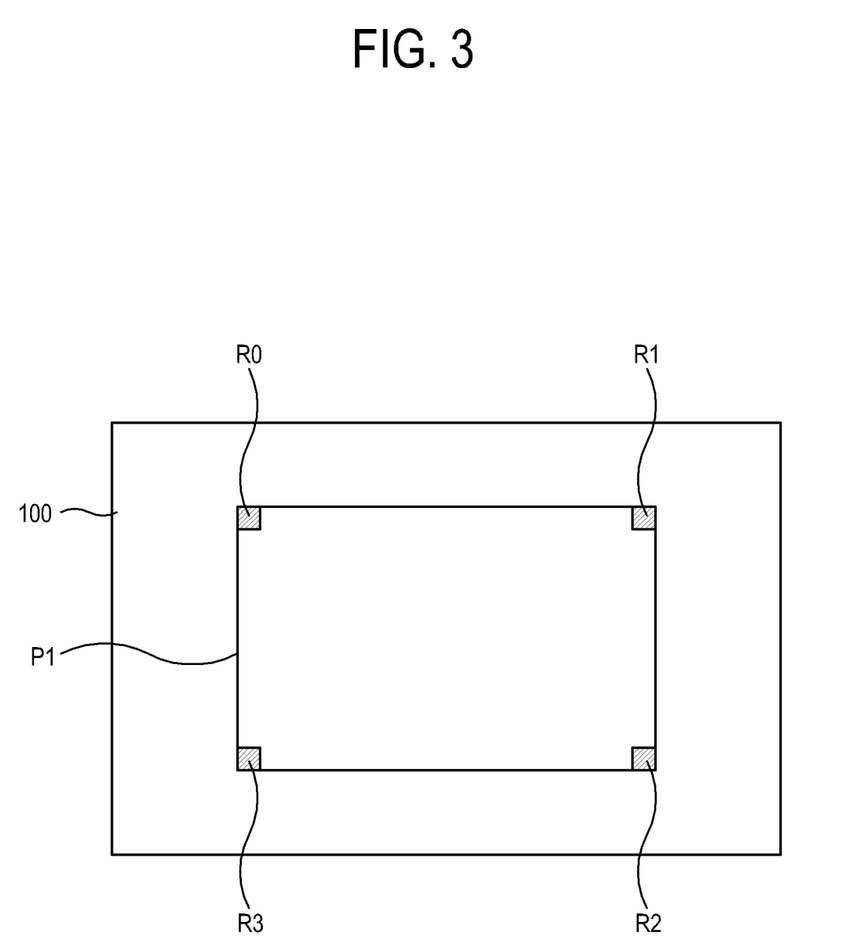
FIG. 3 shows an example of a corresponding region of a reference position in a first image displayed on a screen by the display apparatus of FIG. 1.

FIG. 3 shows an example of a corresponding region of a reference position in a first image displayed on screen 100.

As shown in FIG. 3, in the state that predetermined regions R0, R1, R2 and R3 within the first image P1 are designated to correspond to the reference positions, controller 360 calculates the trace coordinates of the light beam sensed by camera 310 with reference to the reference position of first image P1. When the coordinates are calculated, controller 360 controls video processor 320 to project second image P2 which corresponds to the relevant coordinates on to screen 100, so that second image P2 can be displayed on screen 100 corresponding to the light beam of pointing device 200.

Figure 4:
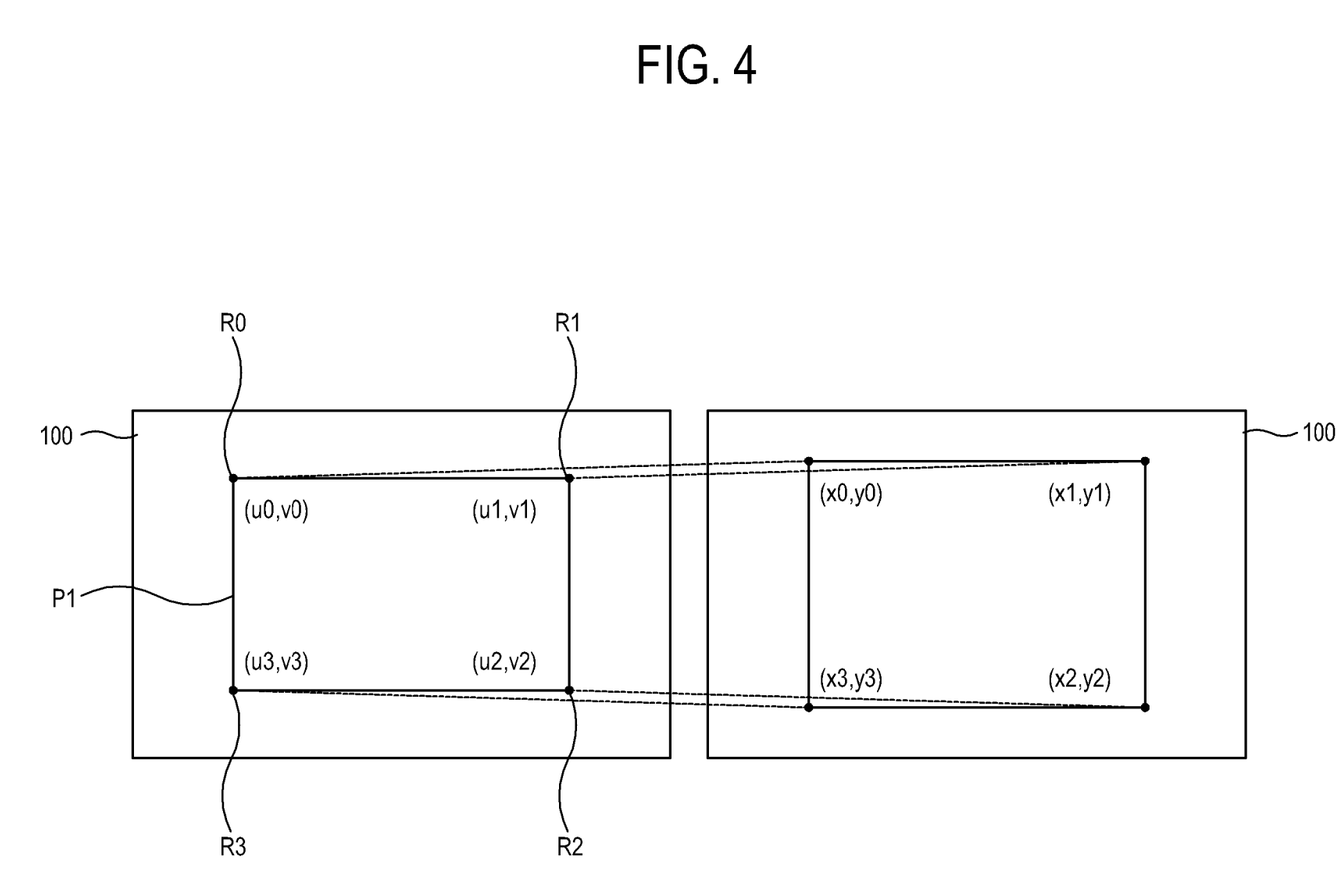
FIG. 4 shows an example of relative position change of the first image on the screen in the display apparatus of FIG. 1.

Meanwhile, first image P1 involving the reference position may be changed in its display characteristic in accordance with change in use environment of display apparatus 300. For example, in response to display apparatus 300 moving from an initial position, the relative position, size, aspect ratio, etc. of first image P1 on screen 100 may be changed in accordance with movement of display apparatus 300. Further, due to the change in first image P1, the reference position may be changed for example as shown in FIG. 4. FIG. 4 shows an example of relative position change of the first image P1 on screen 100.

Referring to FIG. 4, regions R0, R1, R2 and R3 corresponding to the reference positions of first image P1 have initial coordinates (u0, v0), (u1, v1), (u2, v2) and (u3, v3). In response to the position of display apparatus 300 moving, the coordinates of regions R0, R1, R2 and R3 corresponding to the reference positions of first image P1 are correspondingly changed into coordinates (x0, y0), (x1, y1), (x2, y2) and (x3, Y3), respectively.

Thus, in response to the trace coordinates of the light beam being calculated in the state that the reference position is changed, it may be difficult to normally calculate the corresponding coordinates.

Accordingly, in this exemplary embodiment, controller 360 calculates the coordinates of the light beam on the basis of the reference position changed depending on change in display characteristics of first image P1, and transmits the coordinates calculated as above to video processor 320 so that second image P2 corresponding to the calculated coordinates can be displayed on screen 100. Thus, the coordinates are normally calculated on the basis of the reset reference position, and therefore the trace of the light beam can be normally displayed.

Below, a more detailed method will be described.

In response to the position variation of display apparatus 300 sensed by sensor 350 being equal to or higher than a preset value, controller 360 determines that the display characteristic of first image P1 is changed. Here, the preset value is varied depending on characteristic and use environments of display apparatus 300, and is not limited to a specific numerical value.

In response to a determination that the display characteristic of the first image P1 is changed, controller 360 controls video processor 320 to flicker, a predetermined number of times a preset partial region of the first image P1 which corresponds to the reference position, for example, R0, R1, R2 and R3 of FIG. 3. Further, camera 310 senses first image P1, partial regions R0, R1, R2 and R3, which flicker.

Here, only regions R0, R1, R2 and R3 corresponding to the reference positions of first image P1 are flickered, so that a user can view first image P1 without any interference while resetting the reference position, and more distinctively find the reference positions in first image P1.

Controller 360 determines regions R0, R1, R2 and R3 flickering, as above in first image P1, sensed by camera 310, and resets the reference positions on the basis of the coordinates of determined regions R0, R1, R2 and R3.

Further, controller 360 calculates the trace coordinates of the light beam on the basis of the reference position reset as above in response to the trace of the light beam on the screen 100 being sensed by camera 310, and transmits the calculated coordinates to video processor 320. Video processor 320 displays second image P2 on screen 100 on the basis of the received coordinates.

As above, in this exemplary embodiment, the reference position is reset in accordance with change in the display characteristic of the first image P1 containing the reference position, so that the second image P2 corresponding to the trace of the light beam can be displayed on the basis of the reset reference position.

In the foregoing exemplary embodiment, determination that the display characteristic of first image P1 is changed, in response to sensor 350 sensing a change in the position of display apparatus 300. However, the change in the display characteristic the first image is not limited to the foregoing exemplary embodiment. Alternatively, it may be determined that the display characteristic of first image P1 is changed, in response to a setting value about the display characteristic of images P1 and P2 stored in storage unit 330 is changed.

According to this exemplary embodiment, controller 360 monitors whether the setting value about the display characteristic of the first image P1 stored in storage unit 330, for example, a display size, an aspect ratio, resolution, brightness, color, contrast, etc. is changed by user input unit 340 or other various factors.

In response to a determination that the corresponding setting value is changed in this monitoring process, controller 360 determines that the display characteristic of first image P1 is changed, and resets the reference position. For example, in response to a user changing a brightness value of the first image P1 through user input unit 340, controller 360 updates the setting value of storage unit 330 in accordance with a change command from user input unit 340, and determines that the display characteristic of first image P1 is changed, corresponding to this command.

A method of resetting the reference positions may be based on the foregoing exemplary embodiment, and thus repetitive descriptions thereof will be omitted.

Figure 5:
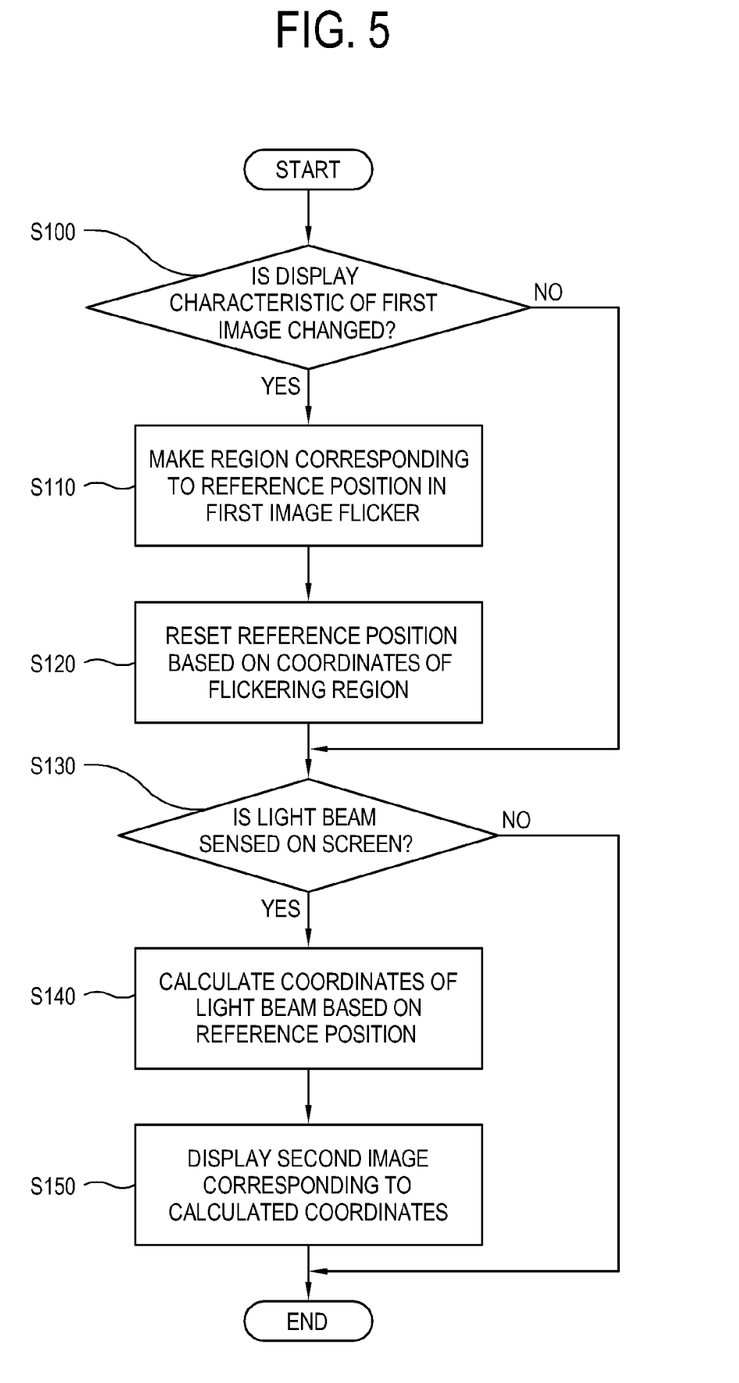
FIG. 5 is a control flowchart showing a control method of the display apparatus of FIG. 1.

Below, a control method of display apparatus 300 in this exemplary embodiment will be described with reference to FIG. 5. FIG. 5 is a control flowchart showing this control method.

As shown in FIG. 5, controller 360 determines whether the display characteristic of the first image P1 is changed (S100).

In response to a determination that the display characteristic of first image P1 is changed, controller 360 causes a region corresponding the reference position in first image P1 flicker a predetermined number of times (S110). Controller 360 resets the reference position on the basis of the coordinates of the flickering regions sensed by camera 310 (S120).

On the other hand, in response to a determination in operation S100 that the display characteristic of first image P1 has not changed, controller 360 does not reset the reference position.

In response to the light beam on screen 100 being sensed by camera 310 (S130), controller 360 calculates the coordinates of the light beam on the basis of reference position (S140). Further, controller 360 controls video processor 320 to display second image P2 which corresponds to the calculated coordinates.

Thus, according to an exemplary embodiment, even though the reference position is changed by various factors, the change of the reference position is sensed so that the reference position can be automatically reset. Thus, an image corresponding to the trace of the light beam of the pointing device 200 can be normally displayed on screen 100 regardless of the change in the reference position.

Meanwhile, in the foregoing exemplary embodiment, when the change in the position of display apparatus 300 is sensed by sensor 350, controller 360 is configured to make a region corresponding to the reference position in the first image flicker, and reset the reference position on the basis of the coordinates of the flickering region.

However, the present inventive concept is not limited to the foregoing exemplary embodiment, and alternatively controller 360 may be configured to determine the reference position by calculating variation in the reference position on the basis of the position variation of display apparatus 300 from the sensor 350. Below, this exemplary embodiment will be described.

Since sensor 350 is achieved by a gyroscope sensor, an acceleration sensor, a geomagnetic sensor, etc., it is possible to calculate the position variation between an initial position and a moved position of display apparatus 300 when the position of display apparatus 300 is moved.

In FIG. 4, the left image shows first image P1 displayed by display apparatus 300 in the initial position, and the right image shows first image P1 displayed by display apparatus 300 in the moved position. Thus, relative coordinates of first image P1 displayed on screen 100 are also varied depending on the position variation of display apparatus 300. For example, coordinates (u0, v0), (u1, v1), (u2, v2) and (u3, v3) of the reference positions in the initial position is changed into (x0, y0), (x1, y1), (x2, y2) and (x3, y3) in the moved position, respectively.

One coordinate (u0, v0) of the reference positions has already been designated in display apparatus 300, and the position variation calculated by sensor 350 is a vector value involving a variation direction. Therefore, the controller 360 can obtain (x0, y0) through simulation of applying the above position variation to (u0, v0).

Such simulation may employ various methods, and does not limit the present inventive concept. For example, the coordinate (x0, y0) of the reference position changed from the coordinate (u0, v0) in the initial position can be calculated as follows.

$$x0=(a11*u0+a21*v0+a31)/(a13*u0+a23*v0+a33)$$

$$y0=(a12*u0+a22*v0+a32)/(a13*u0+a23*v0+a33)$$

Here, values of a11, a12, a13, a21, a22, a23, a31, a32, a33 refer to a 3-by-3 matrix {a11 a12 a13, a21 a22 a23, a31 a32 a33}. This matrix can be calculated by the preset calculation method from the position variation of sensor 350. The method of calculating the 3-by-3 matrix from the position variation of sensor 350 may be variously selected in accordance with the characteristic of the apparatus, and thus detailed descriptions thereof will be omitted.

When the changed coordinates (x0, y0), (x1, y1), (x2, y2) and (x3, y3) are calculated, controller 360 resets the reference positions in accordance with the calculated coordinates. A method of calculating the coordinates of the light beam on the basis of the reset reference position is the same as above.

Thus, according to this exemplary embodiment, controller 360 calculates the coordinates of the reference position varied depending on the change in the position of display apparatus 300 on the basis of the variation in the position vector of display apparatus 300 sensed by sensor 350, and resets the reference position corresponding to the calculated coordinates.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:
a camera which senses a light beam focused on a screen;
a video processor which processes at least one of a first image including a reference position for calculating coordinates of the light beam and a second image corresponding to the coordinates of the light beam to be displayed on the screen; and
a controller which calculates the coordinates of the light beam on the basis of the reference position changed in accordance with change in a display characteristic of the first image, and transmits the calculated coordinates to the video processor so that the second image corresponding to the calculated coordinates is displayed on the screen;
wherein the controller controls the video processor to make a preset partial region of a first image flicker in response to determining a change in the reference position, determines the flickering partial region in the first image sensed by the camera, and resets the reference position on the basis of the coordinates of the determined partial region.

2. The display apparatus according to claim 1, wherein the controller sets up the reference position which corresponds to the coordinates of the preset partial region of the first image sensed by the camera.

3. The display apparatus according to claim 2, wherein the partial region of the first image to be set as the reference position includes at least one of four corners of the first image.

4. The display apparatus according to claim 1, further comprising a sensor which senses change in a position of the display apparatus,
wherein the controller determines that the display characteristic of the first image is changed in response to variation in the position of the display apparatus sensed by the sensor being equal to or higher than a preset value.

5. The display apparatus according to claim 1, further comprising a sensor which senses change in a position of the display apparatus,
wherein the controller calculates coordinates of the reference position changed in accordance with change in a position of the display apparatus on the basis of variation in a position vector of the display apparatus sensed by the sensor, and resets the reference position in accordance with the calculated coordinates.

6. The display apparatus according to claim 5, further comprises: the sensor includes at least one of a gyroscope sensor, an acceleration sensor and a geomagnetic sensor.

7. The display apparatus according to claim 1, wherein the controller determines that a display characteristic of the first image is changed in response to a previously stored setting value regarding a display characteristic of the first image being changed.

8. The display apparatus according to claim 7, wherein the display characteristic of the first image comprises at least one setting value among a relative position of the first image on the screen, and a display size, an aspect ratio, resolution, brightness, color, or contrast, of the first image.

9. The display apparatus according to claim 1, wherein the video processor is of a projection type.

10. A control method of a display apparatus, the method comprising:
sensing a light beam focused on a screen;
sensing change in a display characteristic of a first image including a reference position for calculating coordinates of the light beam; and
calculating the coordinates of the light beam on the basis of the reference position changed in accordance with the change in the display characteristic of the first image, and displaying a second image which corresponds to the calculated coordinates on the screen,
wherein calculating the coordinates of the light beam on the basis of the reference position changed in accordance with the change in the display characteristic of the first image comprises:
making a preset partial region of a first image flicker in response to determining a change in the reference position, determining the flickering partial region in the first image, and resetting the reference position on the basis of coordinates of the determined partial region.

11. The method according to claim 10, wherein the reference position is set up to correspond to the coordinates of the preset partial region of the first image.

12. The method according to claim 11, wherein the partial region of the first image to be set as the reference position includes at least one of four corners of the first image.

13. The method according to claim 10, wherein sensing the change in the display characteristic of the first image includes:
sensing change in a position of the display apparatus; and
determining that the display characteristic of the first image is changed in response to variation in the position of the display apparatus sensed by the sensor is equal to or higher than a preset value.

14. The method according to claim 10, wherein sensing the change in the display characteristic of the first image includes:
sensing variation in a position vector of the display apparatus; and
calculating coordinates of the changed reference position on the basis of the sensed variation in the position vector, and resetting the reference position in accordance with calculated coordinates.

15. The method according to claim 14, wherein sensing the variation in the position vector of the display apparatus includes sensing the variation in the position vector of the display apparatus through at least one of a gyroscope sensor, an acceleration sensor and a geomagnetic sensor.

16. The method according to claim 10, wherein sensing the change in the display characteristic of the first image comprises: determining that a display characteristic of the first image is changed in response to a previously stored setting value about a display characteristic of the first image being changed.

17. The method according to claim 16, wherein the display characteristic of the first image includes at least one setting value from among a relative position of the first image on the screen, and a display size, an aspect ratio, resolution, brightness, color, or contrast, of the first image.

* * * * *